(12) United States Patent
Sobanski (10) Patent No.: US 11,898,463 B2
(45) Date of Patent: Feb. 13, 2024

(54) AIRFOIL ASSEMBLY WITH FIBER-REINFORCED COMPOSITE RINGS

(71) Applicant: RAYTHEON TECHNOLOGIES CORPORATION, Farmington, CT (US)

(72) Inventor: Jon E. Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/215,513

(22) Filed: Mar. 29, 2021

(65) Prior Publication Data

US 2022/0307378 A1 Sep. 29, 2022

(51) Int. Cl.
| | |
|---|---|
| F01D 5/18 | (2006.01) |
| F01D 5/28 | (2006.01) |
| F01D 9/04 | (2006.01) |
| F02C 3/04 | (2006.01) |
| F02C 7/18 | (2006.01) |

(52) U.S. Cl.
CPC ............ F01D 5/282 (2013.01); F01D 5/18 (2013.01); F01D 5/186 (2013.01); F01D 9/041 (2013.01); F02C 3/04 (2013.01); F02C 7/18 (2013.01); F05D 2220/32 (2013.01); F05D 2230/50 (2013.01); F05D 2240/24 (2013.01); F05D 2240/35 (2013.01); F05D 2260/232 (2013.01); F05D 2300/6033 (2013.01)

(58) Field of Classification Search
CPC . F01D 9/041; F01D 9/04; F01D 5/147; F01D 5/282; F01D 5/186
See application file for complete search history.

(56) References Cited

U.S. PATENT DOCUMENTS

| | | | | |
|---|---|---|---|---|
| 3,369,792 A | * | 2/1968 | Theodore | F01D 5/188 415/115 |
| 4,403,917 A | * | 9/1983 | Laffitte | F01D 5/188 415/115 |
| 4,461,612 A | * | 7/1984 | Dodd | F01D 5/189 415/115 |

(Continued)

FOREIGN PATENT DOCUMENTS

| | | |
|---|---|---|
| EP | 2333240 | 6/2011 |
| EP | 3124751 | 2/2017 |
| EP | 3459732 | 3/2019 |

OTHER PUBLICATIONS

European Search Report for European Patent Application No. 22159797.4 dated Sep. 29, 2022.

*Primary Examiner* — Michael L Sehn
(74) *Attorney, Agent, or Firm* — Carlson, Gaskey & Olds, P.C.

(57) ABSTRACT

An airfoil assembly includes first and second fiber-reinforced composite airfoil rings. Each ring is comprised of inner and outer platform sections, a suction side wall that extends between the inner and outer platforms, and a pressure side wall that extends between the inner and outer platforms. the first ring mates at an interface with the second ring such that the suction side wall of the first ring and the pressure side wall of the second ring together form an airfoil that circumscribes an internal cavity. The interface along the airfoil includes a gap that is configured to emit cooling air from the internal cavity.

12 Claims, 8 Drawing Sheets

(56) References Cited

U.S. PATENT DOCUMENTS

| | | |
|---|---|---|
| 7,093,359 B2 | 8/2006 | Morrison et al. |
| 7,094,021 B2 * | 8/2006 | Haubert .................. F01D 9/041 |
| | | 416/193 A |
| 9,017,035 B2 * | 4/2015 | Marmilic ................ F01D 5/189 |
| | | 416/97 R |
| 9,915,154 B2 | 3/2018 | Berczik et al. |
| 10,358,939 B2 | 7/2019 | Walston et al. |
| 10,370,988 B2 * | 8/2019 | Hillier ..................... F01D 25/12 |
| 2016/0281517 A1 | 9/2016 | Kim et al. |
| 2021/0040859 A1 * | 2/2021 | Osgood .................. F01D 5/187 |

\* cited by examiner

AIRFOIL ASSEMBLY WITH FIBER-REINFORCED COMPOSITE RINGS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil assembly according to an example of the present disclosure includes first and second fiber-reinforced composite airfoil rings each comprised of inner and outer platform sections, a suction side wall that extends between the inner and outer platforms, and a pressure side wall that extends between the inner and outer platforms. The first fiber-reinforced composite airfoil ring mates at an interface with the second fiber-reinforced composite airfoil ring such that the suction side wall of the first fiber-reinforced composite airfoil ring and the pressure side wall of the second fiber-reinforced composite airfoil ring together form an airfoil that circumscribes an internal cavity. The interface along the airfoil includes a gap is configured to emit cooling air from the internal cavity.

In a further embodiment of any of the foregoing embodiments, the airfoil defines a leading edge and a trailing edge, and the interface extends through at least one of the leading edge or the trailing edge.

In a further embodiment of any of the foregoing embodiments, each of the first and second fiber-reinforced composite airfoil rings includes an endless braid.

In a further embodiment of any of the foregoing embodiments, the gap diverges from the internal cavity to an exterior of the airfoil.

In a further embodiment of any of the foregoing embodiments, the first and second fiber-reinforced composite airfoil rings include respective mate faces along the interface, and at least one of the mate faces includes flow guides that protrude into the gap.

A further embodiment of any of the foregoing embodiments includes a baffle that has inner and outer end sections, an intermediate section there between, and transition sections from the intermediate section to the inner and outer end sections. The transition sections diverge from the intermediate section to the respective inner and outer end sections.

A further embodiment of any of the foregoing embodiments includes a metering seal in the internal cavity, the metering seal being disposed proximate the gap and including a porous body configured to meter flow of cooling air to the gap.

In a further embodiment of any of the foregoing embodiments, the suction side wall includes a first gusset that projects into the internal cavity and the pressure side wall includes a second gusset the projects into the internal cavity. The first gusset and the second gusset define a passage there between, and the metering seal straddles the first gusset and the second gusset.

In a further embodiment of any of the foregoing embodiments, the metering seal is an endless ring.

In a further embodiment of any of the foregoing embodiments, the suction side wall includes a first gusset that projects into the internal cavity and the pressure side wall includes a second gusset the projects into the internal cavity, a seal that straddles the first gusset and the second gusset, and the seal is non-porous.

In a further embodiment of any of the foregoing embodiments, the fiber-reinforced composite of the first and second fiber-reinforced composite airfoil rings is ceramic matrix composite.

A gas turbine engine according to an example of the present disclosure includes a compressor section, a combustor in fluid communication with the compressor section, and a turbine section in fluid communication with the combustor. The turbine section has a plurality of airfoil assemblies disposed about a central axis of the gas turbine engine. Each of the airfoil assemblies includes first and second fiber-reinforced composite airfoil rings each comprised of inner and outer platform sections, a suction side wall that extends between the inner and outer platforms, and a pressure side wall that extends between the inner and outer platforms. The first fiber-reinforced composite airfoil ring mates at an interface with the second fiber-reinforced composite airfoil ring such that the suction side wall of the first fiber-reinforced composite airfoil ring and the pressure side wall of the second fiber-reinforced composite airfoil ring together form an airfoil that circumscribes an internal cavity. The interface along the airfoil includes a gap configured to emit cooling air from the internal cavity.

In a further embodiment of any of the foregoing embodiments, the airfoil defines a leading edge and a trailing edge, and the interface extends through at least one of the leading edge or the trailing edge.

In a further embodiment of any of the foregoing embodiments, each of the first and second fiber-reinforced composite airfoil rings includes an endless braid.

In a further embodiment of any of the foregoing embodiments, the gap diverges from the internal cavity to an exterior of the airfoil.

In a further embodiment of any of the foregoing embodiments, the first and second fiber-reinforced composite airfoil rings include respective mate faces along the interface, and at least one of the mate faces includes flow guides that protrude into the gap.

A further embodiment of any of the foregoing embodiments includes a baffle that has inner and outer end sections, an intermediate section there between, and transition sections from the intermediate section to the inner and outer end sections. The transition sections diverge from the intermediate section to the respective inner and outer end sections.

A further embodiment of any of the foregoing embodiments includes a metering seal in the internal cavity. The metering seal is disposed proximate the gap and including a porous body configured to meter flow of cooling air into the gap.

In a further embodiment of any of the foregoing embodiments, the suction side wall includes a first gusset that projects into the internal cavity and the pressure side wall includes a second gusset the projects into the internal cavity.

The first gusset and the second gusset defining a passage there between, and the metering seal straddles the first gusset and the second gusset.

A method of fabricating a fiber-reinforced airfoil ring according to an example of the present disclosure includes providing a mandrel that has a mandrel suction side and mandrel pressure side, and forming an endless braid around the mandrel. The endless braid conforms to the mandrel suction side and the mandrel pressure side. The endless braid is then consolidated with a matrix material, after which the mandrel is removed.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
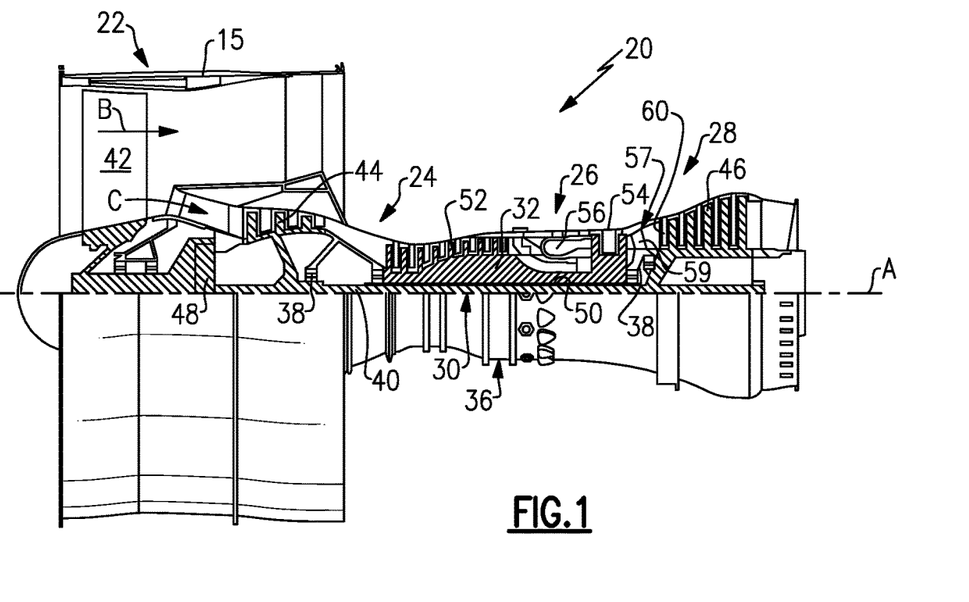
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
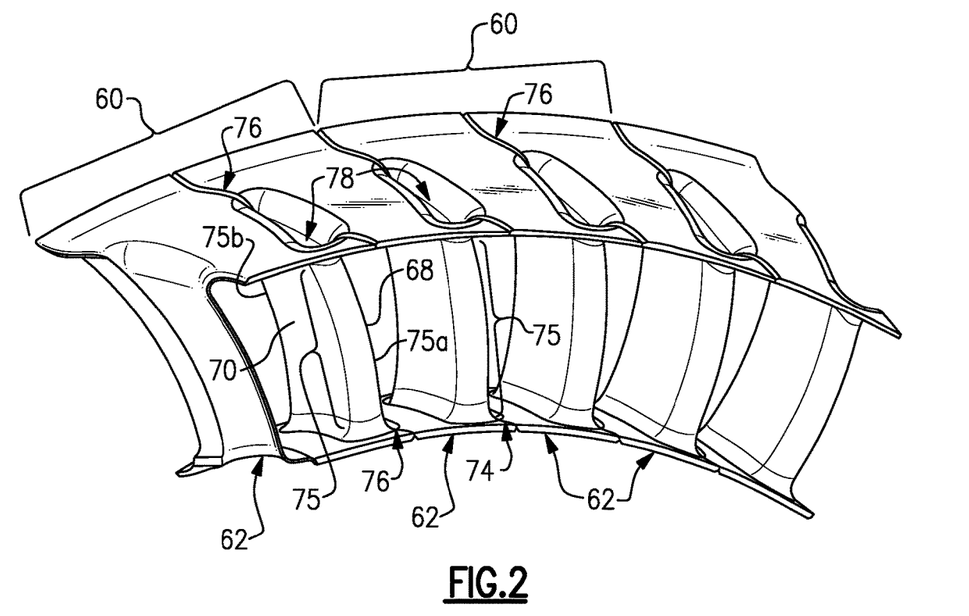
FIG. 2 illustrates a vane assembly.

FIG. 2 illustrates vane assemblies 60 from the turbine section 28 of the engine 20 (see also FIG. 1). It is to be understood that although the examples herein are discussed in context of a vane assembly from the turbine section 28, the examples can be applied to vanes in other sections of the engine 20. The vane assemblies 60 are generally arranged about the engine central axis A to form a full row of vanes and may be supported in the engine 20 via support hardware (not shown).

Figure 3:
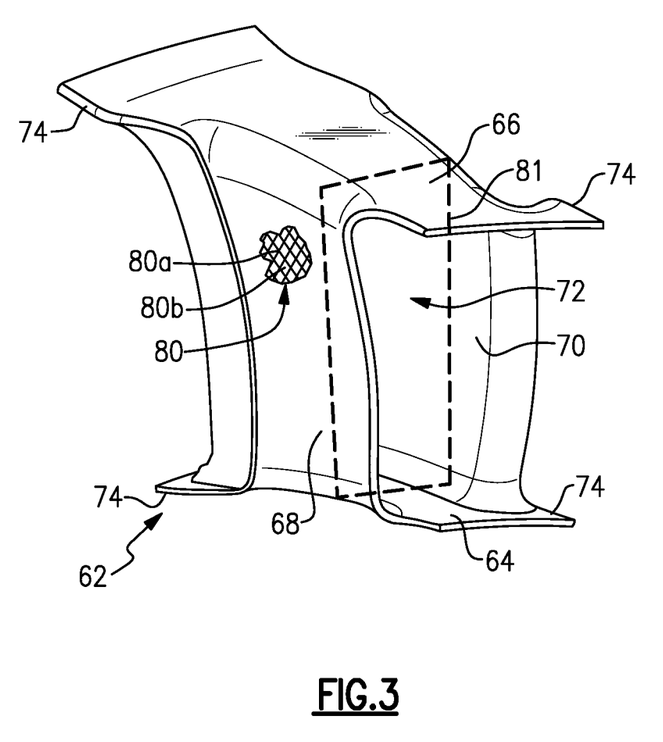
FIG. 3 illustrates a fiber-reinforced composite airfoil ring.

Each vane assembly 60 includes a pair of fiber-reinforced composite airfoil rings 62 that are identical or substantially identical, a representative one of which is shown in an isometric view in FIG. 3. Each ring 62 is composed of inner and outer platform sections 64/66, a suction side wall 68 that extends between the inner and outer platform sections 64/66, and a pressure side wall 70 that also extends between the inner and outer platform sections 64/66. The inner and outer platform sections 64/66, the suction side wall 68, and the pressure side wall 70 include mate faces 74. Together, the inner and outer platform sections 64/66, the suction side wall 68, and the pressure side wall 70 form a ring that circumscribes an open throat 72 through which the combustion gases will expand in the core gas path.

Referring again to FIG. 2, in each vane assembly 60 a first one of the rings 62 mates with a second, adjacent one of the rings 62 in an interface 76. The interface 76 refers to the boundary region of the mate faces 74 when the mate faces 74 are aligned substantially flush with each other in their final assembled position. The suction side wall 68 of the first ring 62 and the pressure side wall 70 of the second ring 62 together form an airfoil 75 that circumscribes an internal cavity 78. The airfoil 75 defines a leading edge 75a and a trailing edge 75b. In the illustrated example, the interface 76 runs along the inner and outer platform sections 64/66 and along the leading and trailing edges 75a/75b of the airfoil 75. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

Figure 4A:
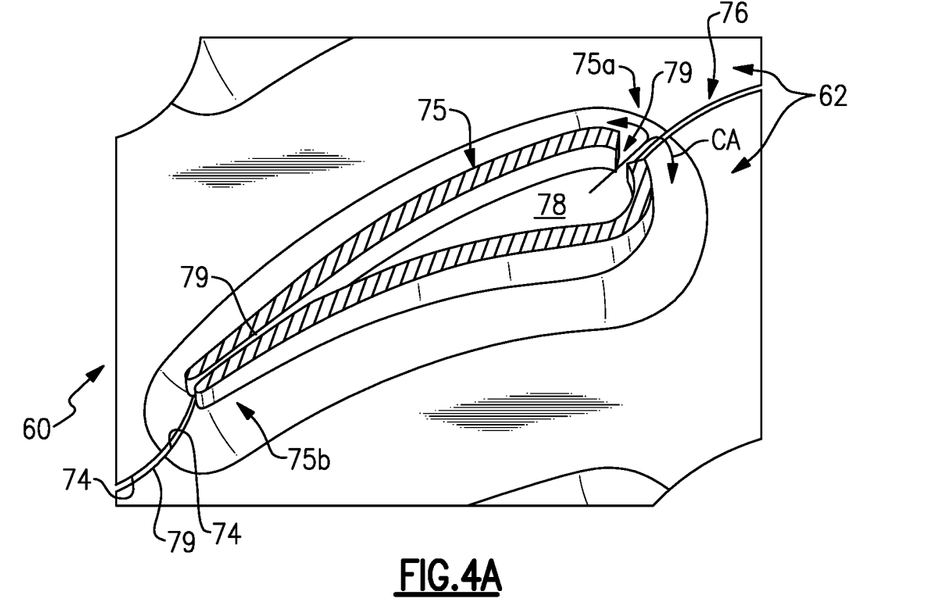
FIG. 4A illustrates a sectioned view of a vane assembly.

FIG. 4A illustrates a sectioned view of the airfoil assembly 60 taken through the airfoil 75. Although the mate faces 74 may meet at some locations in the interface 76, one or more sections the interface 76 include a gap 79 between the adjacent mate faces 74. In the illustrated example, the gap 79 is substantially co-extensive with the full length of the interface 76 and thus runs along the inner and outer platform sections 64/66 and along the leading and trailing edges 75a/75b of the airfoil 75. Cooling air (CA), such as bleed air from the compressor section 24 of the engine 20, is provided to the internal cavity 78. The gap 79 along the airfoil 75 emits the cooling air (CA) from the internal cavity 78 to the exterior surfaces of the airfoil 75 for cooling thereof. In this regard, the location of the interface 76 on the airfoil 75 may be varied, depending on where cooling air is desired. As an example, the interface 76 runs along the leading edge 75a, along the trailing edge 75b, or both. If not both, the interface 76 may run along either the suction or pressure side walls 68/70. Most typically, however, the interface 76 will at least run near the leading and trailing edges 75a/75b, as the geometry may otherwise interfere with assembly.

Figure 4B:
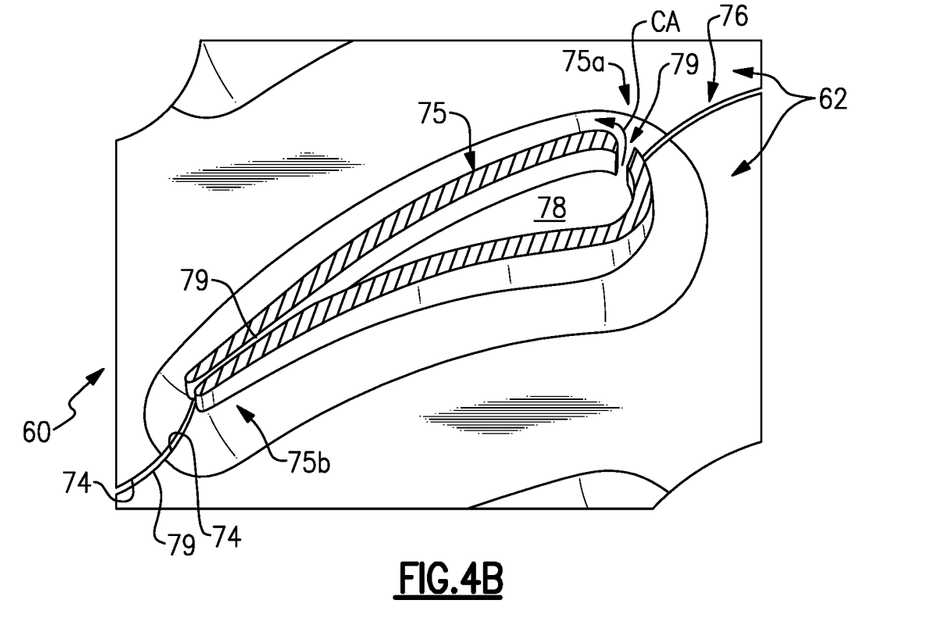
FIG. 4B illustrates a sectioned view of another example of a vane assembly.

Optionally, selected sections of the mate faces 74 may be contoured such that the gap 79 modulates flow of the cooling air (CA). For instance, as shown in FIG. 4A, the mate faces 74 at the leading edge 75a are sloped such that the gap 79 diverges from the internal cavity 78 to the exterior surface of the airfoil 75. The divergence facilitates diffusing the cooling air (CA) so that it leaks along the exterior surfaces for film cooling rather than jetting into the core gas flow. In one example alternative shown in FIG. 4B, the gap 79 has a shiplap-type geometry such that the gap 79 slopes toward the suction side of the airfoil 75. Thus, cooling air (CA) emitted through the gap 79 leaks along the suction side for film cooling rather than jetting into the core gas path.

On the inner and outer platform sections 64/66, the interface 76 extends from the leading edge 75a of the airfoil 75 to the forward edge of the inner and outer platform sections 64/66 and from the trailing edge 75b of the airfoil 75 to the aft edge of the inner and outer platform sections 64/66. Thus, in comparison to conventional platforms that mate over the full length of the platform, the airfoil assembly 60 reduces the overall mate face length, thereby facilitating reductions in leakage in comparison to relatively longer mate interfaces and reductions in weight from relatively shorter seals along the mating interfaces.

Each ring 62 is an endless loop in that the inner and outer platform sections 64/66, suction side wall 68, and pressure side wall 70 constitute a unitary body. As an example, the ring 62 is fabricated of a fiber-reinforced composite 80 (shown in partial cutaway view in FIG. 3). The fiber-reinforced composite 80 is comprised of a network of fiber tows 80a disposed in a matrix 80b. A fiber tow is a bundle of filaments. As an example, a single tow may have several thousand filaments. The tows 80a may be arranged in a fiber architecture, which refers to an ordered arrangement of the tows 80a relative to one another. For instance, the fiber structure is a braided architecture (e.g., bi- or tri-axial braid). In the illustrated example in FIG. 3, the fiber tows 80a are provided as an endless braid, represented at 81, around the throat 72. The endless braid 81 thus resembles a woven sleeve that has no seams.

The fiber-reinforced composite 80 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum.

Figure 5A:
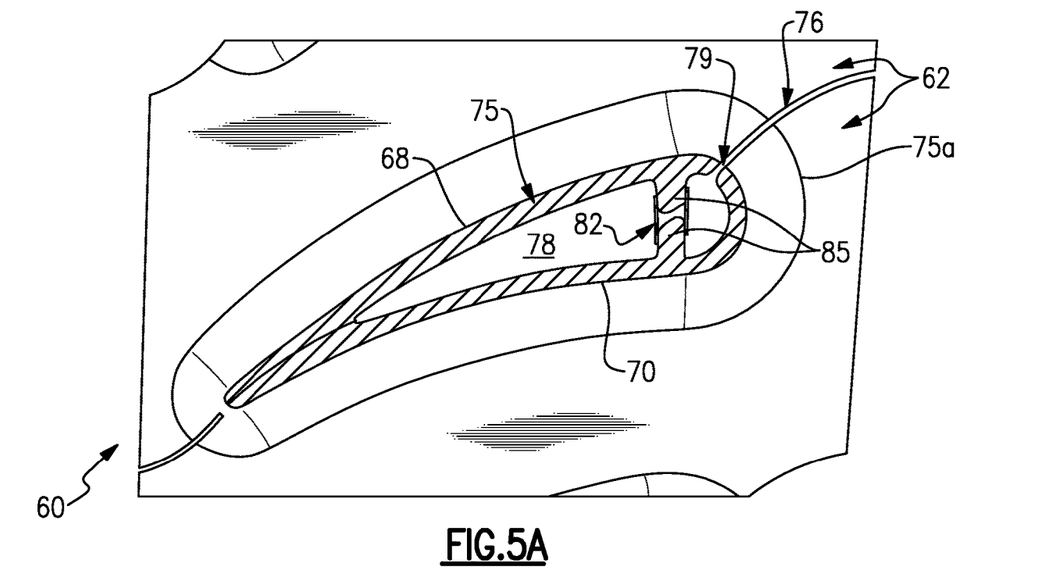
FIG. 5A illustrates an example of a vane assembly with a metering seal and rib gussets.
Figure 5B:
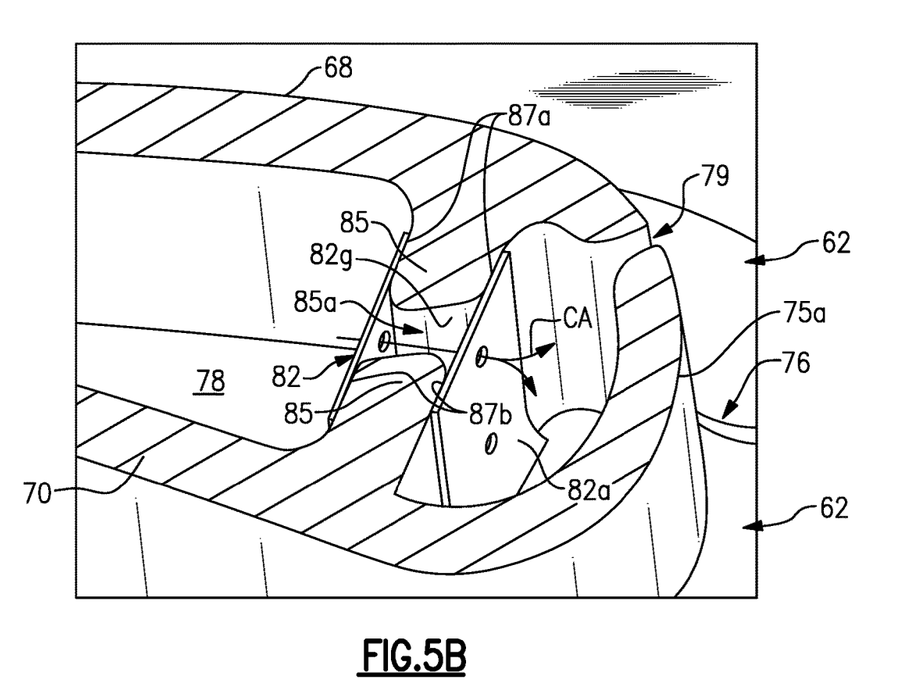
FIG. 5B illustrates another view of the region of the rib gussets and metering seal of FIG. 5A.

In a further example shown in FIGS. 5A and 5B, the airfoil assembly 60 includes a metering seal 82 in the internal cavity 78. The metering seal 82 is disposed proximate the gap 79 in the airfoil 75 and straddles rib gussets 85 that extend from the walls 68/70 into the cavity 78. The rib gussets 85 are radially elongated ridges that span the full or substantially full radial extent of the airfoil 75. The metering seal 82 includes a first pair of legs 87a that straddle one of the rib gussets 85 and a second pair of legs 87b that straddle the other rib gusset 85. Since the airfoil 75 is formed by initially separate rings 62, there is no internal integrated rib between the suction and pressure side walls 68/70 as there might be in some conventional airfoils. In that regard, the rib gussets 85 serve for strengthening and/or stiffening the suction and pressure side walls 68/70 in place of a rib.

The metering seal 82 and rib gussets 85 divide the internal cavity 78 into forward and aft sub-cavities. The rib gussets 85 define a passage 85a there between for flow of cooling air (CA). The metering seal 82 is formed of a porous body 82a that is configured to meter flow of the cooling air (CA) through the passage 85a to the gap 79 in the airfoil 75. As shown, the metering seal 82 is located near the leading edge 75a. However, the metering seal 82 may alternatively be located near the trailing edge 75b, or an additional metering seal 82 may be provided near the trailing edge 75b.

Figure 5C:
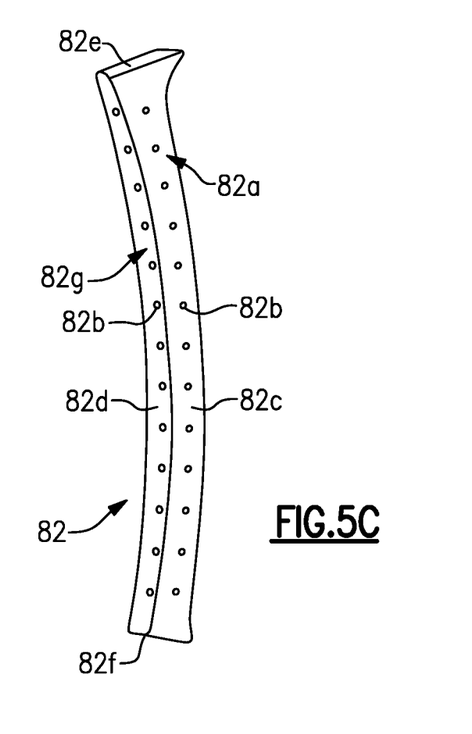
FIG. 5C illustrates an isolated view of a metering seal.
Figure 5D:
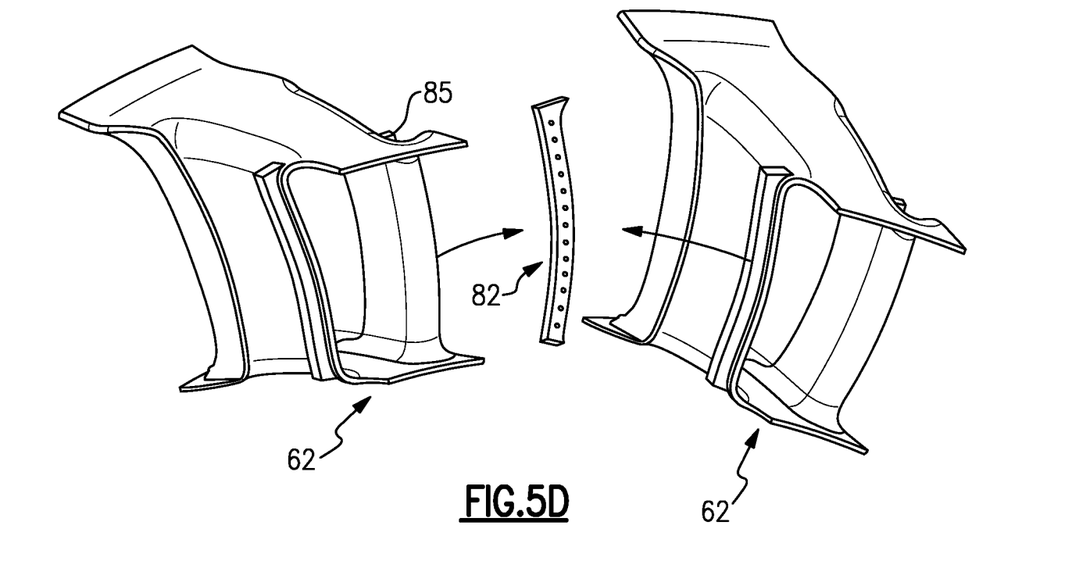
FIG. 5D illustrates an insertion of a metering seal into a vane assembly.

FIG. 5C illustrates an isolated view of the metering seal 82. In this example, metering seal 82 is an elongated (in the radial direction) endless ring and includes a plurality of orifices 82b in forward and aft walls 82c/82d. For example, the metering seal 82 is formed of sheet metal (e.g., nickel- or cobalt-based alloy). The forward and aft walls 82c/82d are joined by radial end walls 82e/82f to form a ring that circumscribes a seal manifold region 82g that coincides with the passage 85a between the rib gussets 85. As shown in FIG. 5D, the when the rings 62 are brought together, the rib gussets 85 fit partially into the seal manifold region 82g (see also FIG. 5B) and thereby support and position the metering seal 82 in the airfoil 75. The orifices 82b fluidly connect the forward and aft sub-cavities via the seal manifold region 82g and serve to meter flow there between. As will be appreciated, the number, size, and pattern of orifices 82b may be modified in order to desirably modulate the flow. For instance, one or more of the orifices 82b in the forward wall 82c may be directed to the side of the gap 79 for impingement cooling of the leading edge 75a (or in the aft wall 82d for the trailing edge 75b if located there). Additionally or alternatively, one or more of the orifices 82b in the forward wall 82c may be directed at the gap 79 in order to facilitate feeding cooling air into the gap 79.

Figure 6:
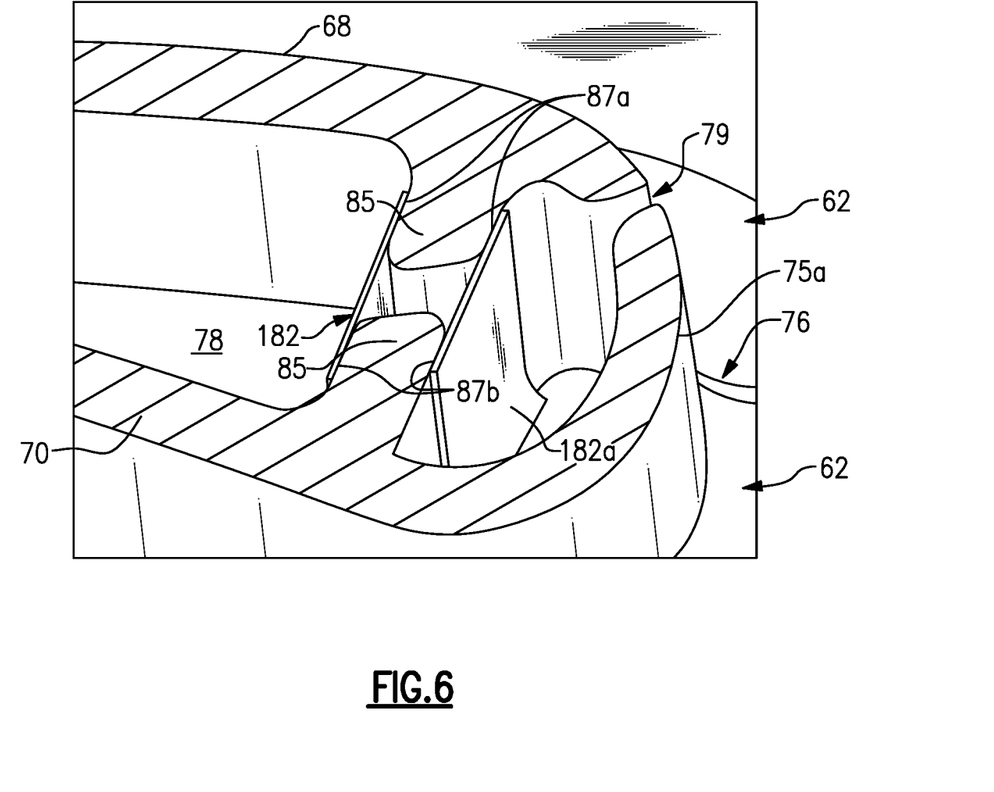
FIG. 6 illustrates another example that has a plain seal.

FIG. 6 illustrates a modified example in which, instead of the metering seal 82, there is a plain seal 182. The plain seal 182 is the same or similar to the metering seal 82 except that the plain seal 182 is formed of a non-porous body 182a that does not have the orifices 82b. The that regard, the plain seal 182 does not permit cooling air to flow between the aft and forward sub-cavities and thus acts as an air seal to fluidly isolate those sub-cavities. Such fluid isolation may permit cooling air of different pressures to be used in the forward and aft sub-cavities, which may be desirable if baffles are used in one or both of the sub-cavities for impingement cooling.

Figure 7:
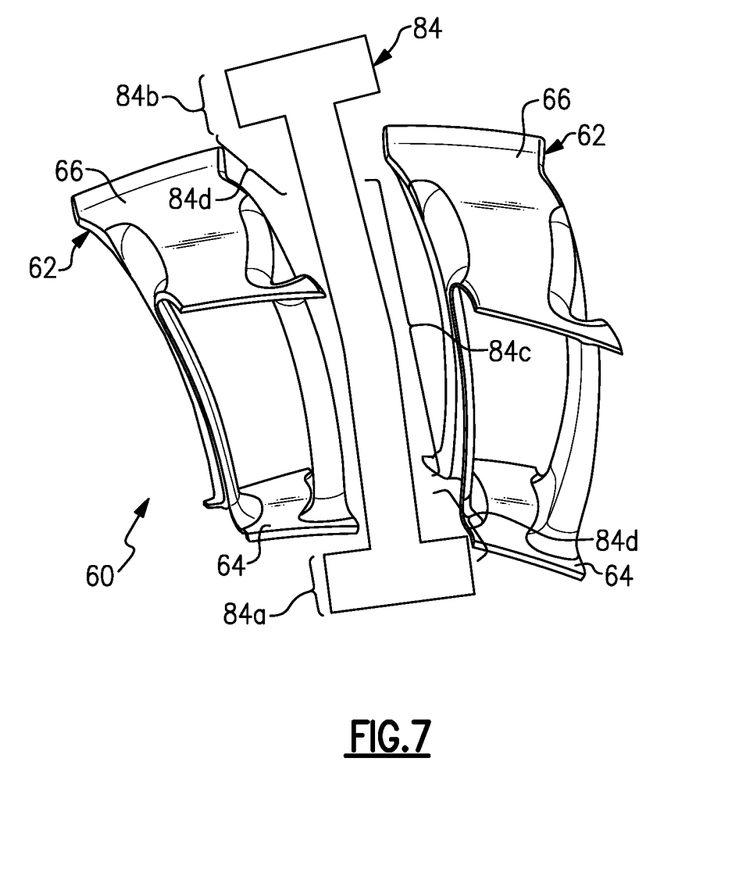
FIG. 7 illustrates a vane assembly with a baffle.

FIG. 7 illustrates another example in which the vane assembly 60 additionally includes a baffle 84 (shown as a line representation). The baffle 84 is sandwiched between the adjacent rings 62 upon assembly. The baffle 84 has inner and outer end sections 84a/84b, an intermediate section 84c there between, and transition sections 84d from the intermediate section 84c to the inner and outer end sections 84a/84b. The transition sections 84d may diverge from the intermediate section 84c to the respective inner and outer end sections 84a/84b. For instance, the cross-sectional area of the baffle 84 may increase through the transition areas 84d moving toward the end sections 84a/84b. In this regard, the end sections 84a/84b have an enlarged cross-sectional area relative to the intermediate section 84c. Such a geometry, with enlarged inner and outer ends, is not feasible in conventional airfoils that require baffles to be inserted into the airfoil from either the inner or outer end. That type of end-insertion requires the end inserted into the airfoil to be relatively small in cross-section so that it can pass through the internal cavity of the airfoil. However, because the baffle 84 here is sandwiched between the rings 62, the baffle 84 can be enlarged at both the inner and outer ends. The enlarged ends provide surface area to facilitate sealing with the inner and outer platform sections 64/66 at both the inner and outer ends.

Figure 8:
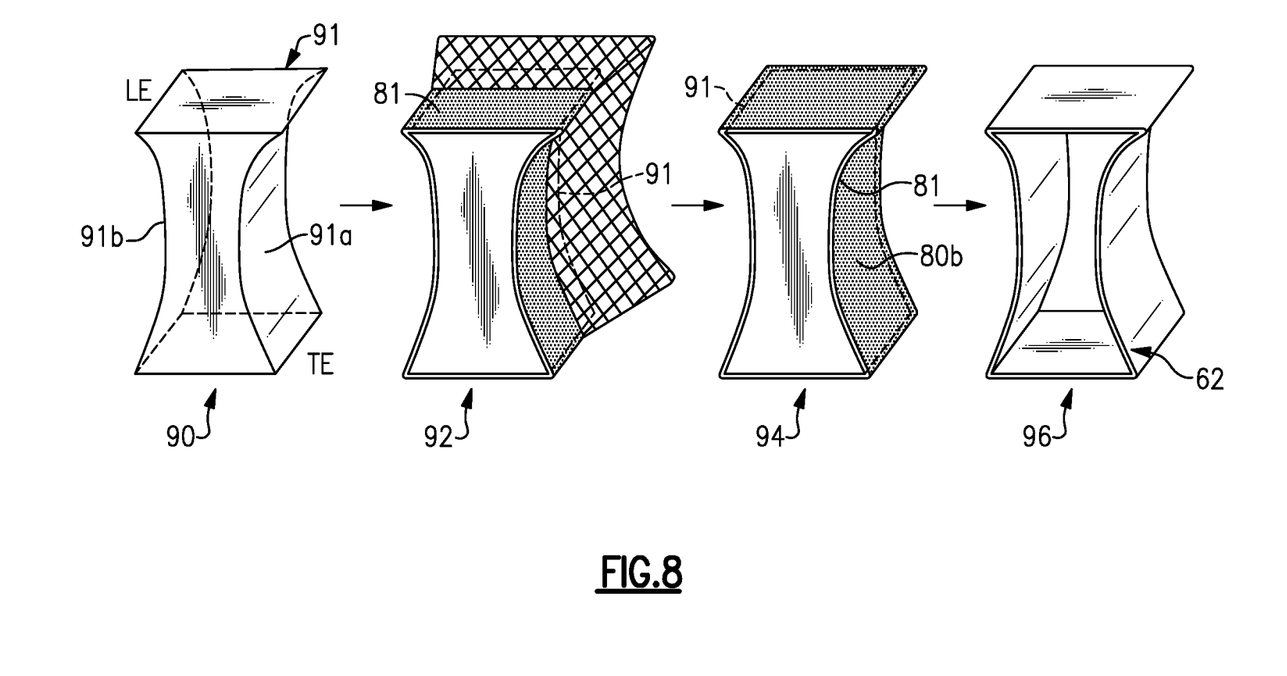
FIG. 8 illustrates a method of fabricating a fiber-reinforced composite airfoil ring.

FIG. 8 illustrates a method of fabricating the fiber-reinforced airfoil ring 62. At 90, the method includes providing a mandrel 91 that has a mandrel suction side 91a and mandrel pressure side 91b. As will be appreciated, the mandrel 91 is shown representatively and the actual geometry will reflect the design shape of the rings 62. For example, the mandrel 91 is made of carbon graphite, although it may alternatively be made of another material that has sufficient strength and durability for the processing. At 92, the method includes forming the endless braid 81 around the mandrel 91. For instance, the forming includes weaving the braid 81 using a loom or other known device. The endless braid 81 conforms to the mandrel suction side 91a and the mandrel pressure side 91b. At 94 the method includes consolidating the endless braid 81 with the matrix material 80b. For example, the consolidation includes chemical vapor infiltration of the endless braid 81 with the matrix material 80b. The consolidation is not limited, however, and other processes such as, but not limited to, polymer infiltration and pyrolysis may additionally or alternatively be used. Finally, at 96 the method includes removal of the mandrel 91, leaving the final ring 62. As an example, the mandrel 91 may be slid out of the ring 62. Alternatively, the mandrel 91 may be provided in several pieces that facilitate removal.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil assembly comprising:
   first and second fiber-reinforced composite airfoil rings each comprised of inner and outer platform sections, a suction side wall extending between the inner and outer platforms, and a pressure side wall extending between the inner and outer platforms, each of the first and second fiber-reinforced composite airfoil rings including an endless braid, the first fiber-reinforced composite airfoil ring mating at an interface with the second fiber-reinforced composite airfoil ring such that the suction side wall of the first fiber-reinforced composite airfoil ring and the pressure side wall of the second fiber-reinforced composite airfoil ring together form an airfoil that circumscribes an internal cavity, wherein the interface along the airfoil includes a gap configured to emit cooling air from the internal cavity, and the gap diverges starting from an inner surface of the internal cavity and continuing to an outer surface of the exterior of the airfoil, the suction side wall including a first gusset projecting into the internal cavity and the pressure side wall including a second gusset projecting into the internal cavity, the first gusset and the second gusset defining a passage there between, and a seal including an aft seal wall including inlet orifices, a forward seal wall including outlet orifices, and radially inner and outer end walls joining the forward seal wall and the aft seal wall to form a seal ring that circumscribes a seal manifold region that connects the inlet orifices and the outlet orifices to provide a flow-through passage through the seal, the forward seal wall and the aft seal wall defining a first pair of legs straddling the first gusset and a second pair of legs straddling the second gusset.

2. The airfoil assembly as recited in claim 1, wherein the airfoil defines a leading edge and a trailing edge, and the interface extends through at least one of the leading edge or the trailing edge.

3. The airfoil assembly as recited in claim 1, further comprising a baffle that has inner and outer end sections, an intermediate section there between, and transition sections from the intermediate section to the inner and outer end sections, the transition sections diverging from the intermediate section to the respective inner and outer end sections.

4. The airfoil assembly as recited in claim 1, wherein the fiber-reinforced composite of the first and second fiber-reinforced composite airfoil rings is ceramic matrix composite.

5. The airfoil assembly as recited in claim 1, wherein the endless braid is a seamless woven sleeve.

6. The airfoil assembly as recited in claim 5, wherein the seamless woven sleeve extends through the inner and outer platform sections, through the suction side wall, through the pressure side wall, and from a leading edge to a trailing edge of the suction side wall and the pressure side wall.

7. A gas turbine engine comprising:
a compressor section;
a combustor in fluid communication with the compressor section; and
a turbine section in fluid communication with the combustor, the turbine section having a plurality of airfoil assemblies disposed about a central axis of the gas turbine engine, each of the airfoil assemblies includes:
first and second fiber-reinforced composite airfoil rings each comprised of inner and outer platform sections, a suction side wall extending between the inner and outer platforms, and a pressure side wall extending between the inner and outer platforms, the first fiber-reinforced composite airfoil ring mating at an interface with the second fiber-reinforced composite airfoil ring such that the suction side wall of the first fiber-reinforced composite airfoil ring and the pressure side wall of the second fiber-reinforced composite airfoil ring together form an airfoil that circumscribes an internal cavity, wherein the interface along the airfoil includes a gap configured to emit cooling air from the internal cavity, and a seal in the internal cavity, the seal being disposed proximate the gap, the suction side wall including a first gusset projecting into the internal cavity and the pressure side wall including a second gusset projecting into the internal cavity, the first gusset and the second gusset defining a passage there between, and the seal including an aft seal wall including inlet orifices, a forward seal wall including outlet orifices, and radially inner and outer end walls joining the forward seal wall and the aft seal wall to form a seal ring that circumscribes a seal manifold region that connects the inlet orifices and the outlet orifices to provide a flow-through passage through the seal, the forward seal wall and the aft seal wall defining a first pair of legs straddling the first gusset and a second pair of legs straddling the second gusset.

8. The gas turbine engine as recited in claim 7, wherein the airfoil defines a leading edge and a trailing edge, and the interface extends through at least one of the leading edge or the trailing edge.

9. The gas turbine engine as recited in claim 7, wherein each of the first and second fiber-reinforced composite airfoil rings includes an endless braid.

10. The gas turbine engine as recited in claim 7, wherein the gap diverges from the internal cavity to an exterior of the airfoil.

11. The gas turbine engine as recited in claim 7, wherein the first and second fiber-reinforced composite airfoil rings include respective mate faces along the interface, and at least one of the mate faces includes flow guides that protrude into the gap.

12. The gas turbine engine as recited in claim 7, further comprising a baffle that has inner and outer end sections, an intermediate section there between, and transition sections from the intermediate section to the inner and outer end sections, the transition sections diverging from the intermediate section to the respective inner and outer end sections.

* * * * *